United States Patent [19]

Sakai et al.

[11] Patent Number: 5,079,658
[45] Date of Patent: Jan. 7, 1992

[54] DOUBLE-HEAD MAGNETIC TRANSDUCER ASSEMBLY FOR HELICAL SCAN TYPE TAPE RECORDERS

[75] Inventors: Kunihide Sakai, Ebina; Hiroshi Minami, Sagamihara, both of Japan

[73] Assignee: Victor Company of Japan, Ltd., Japan

[21] Appl. No.: 686,885

[22] Filed: Apr. 17, 1991

Related U.S. Application Data

[63] Continuation of Ser. No. 436,574, Nov. 15, 1989, abandoned.

Foreign Application Priority Data

[30]
Nov. 30, 1988 [JP] Japan ................................. 63-303399

[51] Int. Cl.$^5$ ...................... G11B 5/027; G11B 5/265
[52] U.S. Cl. .................................. 360/104; 360/84; 360/121
[58] Field of Search ............ 360/104, 84–85, 360/120, 121, 9.1, 122, 125

[56] References Cited

U.S. PATENT DOCUMENTS

| | | | |
|---|---|---|---|
| 4,510,538 | 4/1985 | Sato et al. | 360/84 |
| 4,609,947 | 9/1986 | Yamagiwa et al. | 360/84 X |
| 4,758,916 | 7/1988 | Niwa et al. | 360/121 |
| 4,768,120 | 8/1988 | Hatanai | 360/121 |
| 4,860,132 | 8/1989 | Lorteiji | 360/104 X |
| 4,897,745 | 1/1990 | Binder-Kriegelstein | 360/104 X |
| 4,922,359 | 5/1990 | Nakamura | 360/84 X |

Primary Examiner—John H. Wolff
Attorney, Agent, or Firm—Lowe, Price, Leblanc & Becker

[57] ABSTRACT

A double-head magnetic transducer assembly for use in a helical scan type tape recorder which comprises first and second magnetic heads secured to a head base so as to be successively arranged in spaced relationship to each other in the direction of transport of a magnetic tape. Each of the first and second magnetic heads has I-shaped and L-shaped core halves which are coupled to each other to form a magnetic gap and the length of the I-shaped core half in the direction of rotation of the transducer assembly is arranged to be above 0.175 millimeters.

6 Claims, 1 Drawing Sheet

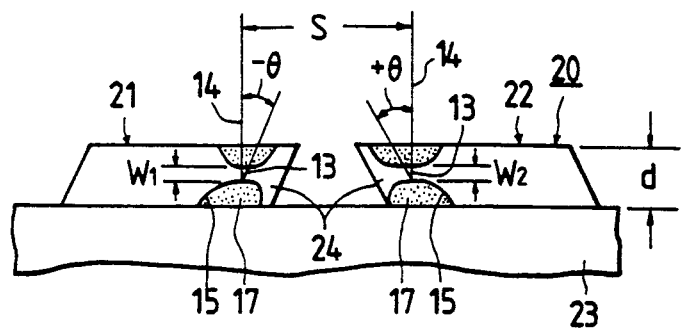
FIG. 1A
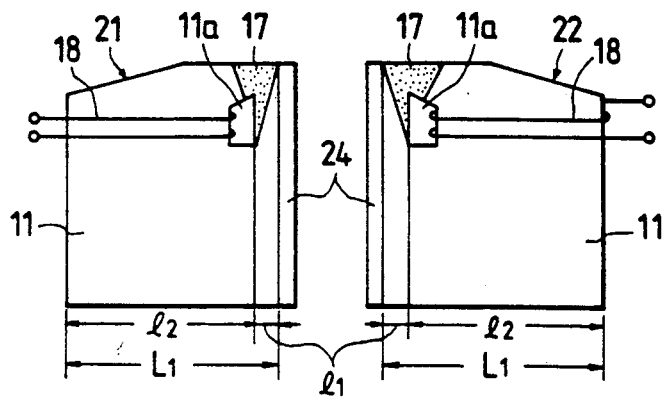
FIG. 1B
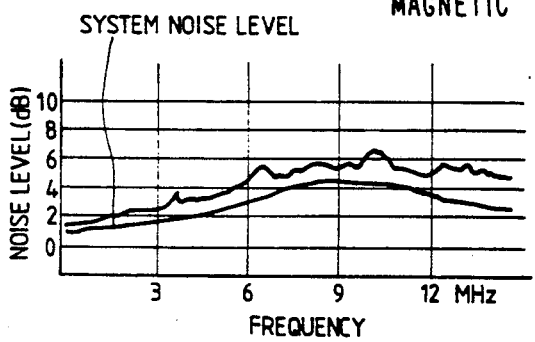
FIG. 2 DOUBLE HEADED MAGNETIC TRANSDUCER
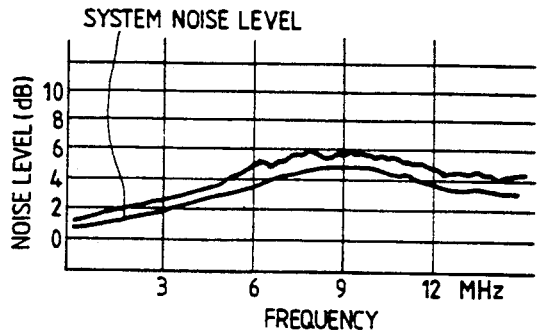
FIG. 3 PRIOR ART  SINGLE HEAD MAGNETIC TRANSDUCER

DOUBLE-HEAD MAGNETIC TRANSDUCER ASSEMBLY FOR HELICAL SCAN TYPE TAPE RECORDERS

This application is a continuation of application Ser. No. 07/436,574, filed Nov. 15, 1989 now abandoned.

BACKGROUND OF THE INVENTION

The present invention relates generally to electromagnetic transducers, and more particularly to a double-head magnetic transducer assembly for use in tape recorders such as a helical scan type video tape recorder.

Double-head transducer assemblies are currently employed in helical scan type video tape recorders to effect special playback modes such as a still-picture playback. Such a double-head transducer assembly comprises a pair of magnetic heads fixedly secured to a single base so as to be arranged successively in spaced relation to each other in the direction of transport of a magnetic tape mounted in the video tape recorder. There is a problem which arises with such a double-head transducer assembly, however, in that as compared with a single-head transducer its reproduction output is extremely lowered in the high-frequency region and the signal-to-noise ratio is also lowered because of increase in so-called tape-sliding noises, thereby resulting in deterioration of the reproduction characteristic.

SUMMARY OF THE INVENTION

It is therefore an object to the present invention to provide a double-head magnetic trasducer assembly which is capable of providing an adequate reproduction characteristic.

A double-head magnetic transducer assembly according to this invention comprises first and second magnetic heads secured to a head base so as to be successively arranged in spaced relationship to each other in the direction of transport of a magnetic tape and each of the first and second magnetic heads has I-shaped and L-shaped core halves which are coupled to each other to form a magnetic gap. A feature of the double-head magnetic transducer assembly is that the length of the I-shaped core half in the direction of rotation of the transducer assembly is arranged to be above 0.175 millimeters.

BRIEF DESCRIPTION OF THE DRAWINGS

The present invention will be described in further detail with reference to the accompanying drawings, in which:

FIG. 1A is a front view showing a double-head magnetic transducer assembly according to an embodiment of the present invention;

FIG. 1B is a bottom view showing the arrangement of a pair of magnetic heads of the FIG. 1A transducer assembly where a head base is not illustrated;

FIG. 2 is a graphic diagram showing the tape-sliding noise state with respect to frequencies which is attained when using the double-head magentic transducer assembly of this embodiment; and FIG. 3 is a graphic diagram showing the tape-sliding noise state relative to frequencies which is obtained when using a prior art signal-head magnetic transducer.

DETAILED DESCRIPTION OF THE INVENTION

Referring now to FIGS. 1A and 1B, there is illustrated a double-head magnetic transducer assembly 20 according to an embodiment of the present invention, comprising a head base 23 and a pair of magnetic heads 21 and 22 having different azimuth angles $-\theta$ and $+\theta$ for elimination of crosstalk problems. The pair of magnetic heads 21 and 22 are fixedly secured to the head base 23 so as to be positioned symmetrically and spaced by a predetermined distance relative to each other. The head base 23 is carried by a rotary cylinder of a helical scan type video tape recorder, not shown, to expose the magnetic heads 21 and 22 slightly beyond the circumference of the rotary cylinder so that the tape-contact surfaces thereof come into contact with a magnetic tape, not shown.

Each of the magnetic heads 21 and 22 has a predetermined thickness d and a predetermined length L1, and comprises a first core half 11 and a second core half 24 which are made of a ferromagnetic material such as MnZn ferrite monocrystal. The first core half 11 has a L-shaped configuration to form a slot 11a for a winding 18 and the second core half 24 has an I-shaped configuration. The first and second core halves 11 and 24 have surfaces with inclined angles corresponding to the azimuth angles $+\theta$ and $-\theta$ of magnetic gaps 13, and have lengths l2 and l1, respectively, in the tape-transport direction and are integrally coupled to each other through a magnetic gap defining member 17, made of a glass (for example) and filled in a track-width limiting recess portion 15, so as to form the magnetic gap 13, whose width is W1 or W2, inclined by the azimuth angle $-\theta$ or $+\theta$ with respect to the perpendicular line 14 of the head-rotating direction. In the double-head magnetic transducer assembly 20, the interval S between the magentic gaps 13 of the magnetic heads 21 and 22 is determined so as to be a length (2H) substantially corresponding to twice the recorded track length of a horizontal scanning period (1H). For example, 1H is about 0.370 mm in the NTSC system and about 0.310 mm in the PAL system.

Here, a feature of this invention is to determine the length l1 of the I-shaped core half 24 in the tape-transport direction to be above a given value. That is, a presumption can be made such that the magnetic resistance of the I-shaped core half 24 is relatively high because of a smaller coross section, thereby resulting in deterioration of the reproduction efficiency, and further the smaller cross section causes the fact that the I-shaped core half 24 is greatly subjected to influence of the natural vibration due to the tape sliding to increase the sliding noises. The following table shows the relation of the reproduction output and sliding noise with respect to the length l1 of the I-shaped core half 24 which has been obtained by an experiment.

TABLE

| No. | Length of I-Shaped Core Half (l1) | Sliding Noise Level (6 to 12 MHz) | Reproduction Output Level (6 MHz) |
| --- | --- | --- | --- |
| 1 | 0.1 mm | +2.5 dB | −2.0 dB |
| 2 | 0.125 mm | +2.0 dB | −2.0 dB |
| 3 | 0.15 mm | +1.5 dB | −1.5 dB |
| 4 | 0.175 mm | +0.5 dB | −0.5 dB |
| 5 | 0.200 mm | 0 dB | 0 dB |
| 6 | 0.225 mm | 0 dB | 0 dB |

TABLE-continued

| No. | Length of I-Shaped Core Half (l1) | Sliding Noise Level (6 to 12 MHz) | Reproduction Output Level (6 MHz) |
|---|---|---|---|
| 7 | 0.5 mm | 0 dB | 0 dB |

The above-mentioned experiment has been effected under the following conditions:

Magnetic Head: Head for the EP mode (6 hour recording) forming a track width of 29 micrometers narrower than that (60 micrometers) of a head for the SP mode (standard mode, i.e., 2 hour recording)

Length of the L-shaped core half: above 1.2 mm

Thickness d: 0.14 mm

Noise Level: Assuming that the level of a signal head transducer is 0 dB at a frequency of 6 MHz to 12 MHz (per one turn of the winding)

Output Level: Assuming that the level of a signal head transducer is 0 dB at a frequency of 7 MHz (per one turn of the winding)

It has been found from the above table that, when the length l1 of the I-shaped core half 24 is above 0.175 mm, both the sliding noise level and reproduction output level become 0 dB which is substantiall equal to that of a single-head transducer.

Accordingly, in this embodiment of the present invention, the length l1 of the I-shaped core half 24 is determined to be above 0.175 mm.

Here, for reducing the magnetic resistance, there is considered a manner that the cross-section of the I-shaped core half 24 is increased so as to increase the thickness d. However, the increase in the thickness d causes deterioration of the contact state between the magentic head and the tape, thereby resulting in lowering the reproduction output level. Thus, the thickness d is required to be below 0.2 mm. In the above experiment, d is set to be 0.14 mm.

FIG. 2 is a graphic diagram showing the tape-sliding noises relative to frequencies under the condition that the length l1 of the I-shaped core half 24 in the head-rotating direction is 0.225 mm. From this illustration, the tape-sliding noise state of the double-head magnetic transducer assembly of this embodiment is substantially equivalent to that of a prior art signal-head transducer shown in FIG. 3.

It should be understood that the foregoing relates to only a preferred embodiment of the present invention, and that it is intended to cover all changes and modifications of the embodiment of this invention herein used for the purposes of the disclosure, which do not constitute departures from the spirit and scope of the invention.

What is claimed is:

1. An electromagnetic transducer assembly adapted to be mounted on a rotary cylinder of a tape recorder, comprising:
   a non-magnetic head base; and
   first and second magnetic heads secured to said head base so as to be successively arranged in spaced relationship to each other in the direction of transport of a magnetic tape, said first and second magnetic heads having magnetic gaps, respectively, and the interval between said magnetic gaps being a length substantially corresponding to twice a recorded track length of a horizontal scanning period (1H) (1H being about 0.370 mm in the NTSC system and about 0.310 in the PAL system), each of said first and second magnetic heads having I-shaped and L-shaped core halves which are coupled to each other to form said magnetic gaps and the length of said I-shaped core half in the tape-transport direction being arranged to be above 0.175 millimeters to reduce the sliding noises of the head.

2. An electromagnetic transducer assembly as claimed in claim 1, wherein each of said first and second magnetic heads is basically made of a MnZn ferrite monocrystal.

3. An electromagnetic transducer assembly as claimed in claim 1, wherein the thickness of each of said first and second magnetic heads is below 0.2 mm.

4. An electromagnetic transducer assembly as claimed in claim 3, wherein the length of said L-shaped core half in the tape-transport direction is substantially above 1.2 mm.

5. An electromagnetic transducer assembly as claimed in claim 1, wherein the thickness of each of said first and second magnetic heads is below 0.2 mm.

6. An electromagnetic transducer assembly as claimed in claim 5, wherein the length of said L-shaped core half in the tape-transport direction is substantially above 1.2 mm.

* * * * *